United States Patent
Verlinde et al.

(10) Patent No.: US 12,234,642 B2
(45) Date of Patent: Feb. 25, 2025

(54) CEILING PANEL SUPPORT SYSTEM

(71) Applicant: Hunter Douglas Industries B.V., Rotterdam (NL)

(72) Inventors: Marijn Verlinde, Rotterdam (NL); Michiel Langeveld, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

(21) Appl. No.: 17/773,256

(22) PCT Filed: Oct. 27, 2020

(86) PCT No.: PCT/EP2020/080131
§ 371 (c)(1),
(2) Date: Apr. 29, 2022

(87) PCT Pub. No.: WO2021/083863
PCT Pub. Date: May 6, 2021

(65) Prior Publication Data
US 2024/0151030 A1 May 9, 2024

(30) Foreign Application Priority Data
Nov. 1, 2019 (GB) ...................................... 1915927

(51) Int. Cl.
*E04B 9/00* (2006.01)
*E04B 9/36* (2006.01)
(52) U.S. Cl.
CPC .................................... *E04B 9/366* (2013.01)
(58) Field of Classification Search
CPC ....................................................... E04B 9/366
(Continued)

(56) References Cited

U.S. PATENT DOCUMENTS 9,038,344 B2 * 5/2015 Mayer .................. F21V 33/006
52/39
10,689,850 B2 * 6/2020 Langeveld ............... E04B 9/26
(Continued)

FOREIGN PATENT DOCUMENTS

| EP | 3321442 A1 | 5/2018 |
|---|---|---|
| GB | 622156 A | 4/1949 |
| JP | S 49130041 U | 11/1974 |

OTHER PUBLICATIONS

International Search Report and Written Opinion issued in PCT/EP2020/080131 Dated Feb. 1, 2021 (9 pages).

*Primary Examiner* — James J Buckle, Jr.
(74) *Attorney, Agent, or Firm* — Dority & Manning, P.A.

(57) ABSTRACT

A ceiling panel support system includes a ceiling panel and a mounting bracket. The ceiling panel has an upper part including an elongate support portion, with the support portion having an elongate support channel including a pair of opposing lips defining an elongate opening into the elongate support channel. The mounting bracket has a main body, a holding part configured to be housed within the elongate support channel behind inwardly facing surfaces of the opposing lips, and a leg configured to extend from the main body to the holding part between the opposing lips. The main body includes lower surfaces on either side of the leg configured to face the support portion. The system further includes a securing member that presses the holding part against the inwardly facing surfaces of the opening lips and secures the mounting bracket frictionally along the elongate extent of the panel.

18 Claims, 11 Drawing Sheets

(58) Field of Classification Search
USPC .............................................................. 52/36
See application file for complete search history.

(56) References Cited

U.S. PATENT DOCUMENTS

| | | | |
|---|---|---|---|
| 10,947,724 B2* | 3/2021 | Langeveld | E04B 9/363 |
| 11,891,804 B2* | 2/2024 | Kabatsi | E04B 9/005 |
| 2018/0127975 A1* | 5/2018 | Gillette | E04B 9/0414 |
| 2018/0127984 A1* | 5/2018 | Langeveld | F16B 5/0685 |

* cited by examiner

CEILING PANEL SUPPORT SYSTEM

This application is a national phase application of International Patent Application No. PCT/EP2020/080131, filed Oct. 27, 2020, which, in turn, claims the right of priority to GB Application No. 1915927.6, filed Nov. 1, 2019, both of which are hereby incorporated herein by reference in their entirety for all purposes.

The present application relates to a ceiling panel support system, in particular including ceiling baffles as the ceiling panels and especially felt baffles.

It is known to suspend from a ceiling structure a plurality of baffles. These are elongate panels which are generally larger in height than in width. It is also known to construct such ceiling baffles from a felt material, for example as described in US 2018/0127975. It is similarly known to suspend vanes and panels as described in U.S. Pat. No. 9,038,344.

It would be desirable to provide an improved support system which allows relatively easy installation, freedom of positioning, and security when installed.

According to the present invention, there is provided a ceiling panel support system including a ceiling panel and a mounting bracket for suspending the ceiling panel. The ceiling panel has an elongate extent in a longitudinal direction and has a elongate support portion from which the panel can be suspended using the mounting bracket. The elongate support channel has a pair of opposing lips defining an elongate opening. The opposing lips have, respectively, inwardly facing surfaces. A holding part of the mounting bracket is configured to be housed behind the inwardly facing surfaces of the opposing lips. The mounting bracket has a main body to be suspended by a carrier. The mounting bracket also has a leg configured to extend from the main body to the holding part between the opposing lips. In a usual orientation, the support portion faces upwardly. In this respect, the mounting bracket includes lower surfaces on either side of the leg configured to face the support portion when the mounting bracket is fitted to the baffle with the holding part housed within the elongate support channel. The system additionally includes a securing member. The securing member may include a base surface configured to engage with the support portion. The securing member may include a top surface configured to engage with the lower surfaces of the mounting bracket. The securing member is configured to be inserted between the support portion and the lower surfaces of the main body of the mounting bracket. In use, the holding part is thus pressed against the inwardly facing surfaces of the opening lips. In this way, the securing member secures the mounting bracket frictionally along the elongate extent of the panel.

In this way, each ceiling panel may be supported by one or more mounting brackets having their respective holding parts engaged within the elongate support channel of the ceiling panel. The holding parts may be freely slidable along the elongate support channel to any appropriate positions. For example, one or more carriers may be spaced at intervals along the longitudinal direction and the main body of the respective mounting bracket may be attached in any known manner to a respective carrier. With the arrangement as described, the mounting brackets may easily be positioned along the elongate support channel and the respective ceiling panel as required. Once in position, the securing member provides a convenient and effective way of securing the mounting bracket with respect to the elongate extent of the panel. If the panel needs to be repositioned, the securing member can be removed without tools and the ceiling panel moved again to its desired position.

The ceiling panel support system may be used where the ceiling panel is a baffle. For example, the ceiling panel may be a felt baffle, or a baffle made of metal, for example aluminium.

The support portion may be a separate mounting profile having a substantially constant cross-section along the elongate extent, or be integral with the baffle itself.

The support portion may include an elongate support channel facing outwardly from the panel and including the pair of opposing lips opening into the channel. In a usual orientation, the elongate support channel and adjacent surfaces of the support portion face upwardly.

With the same/constant cross-section along the length of the support portion, the same mounting bracket (with the same holding part) may be used (by sliding) at any position along the length of the support portion.

The support portion may be constructed for example of a plastics material, aluminium etc. It may be produced as an extrusion. It may be provided as part of a ceiling panel, for example a baffle, constructed otherwise of a different material, such as felt.

In this way, the support portion may be provided with material properties allowing the entire ceiling panel to be supported at intervals. In particular, the support portion may provide the structural integrity for such support. Also, the support portion may be provided with appropriate material properties for engaging with the securing member and withstanding the pressure of the securing member between the lower surfaces of the main body and the upper surfaces of the support portion.

The mounting bracket may comprise a plate member. In other words, it may be constructed from a material, such as metal, having a relatively thin constant thickness. The plate member may be flat/planar or include a slight curve. The plate member may have opposite cut-outs on opposite respective sides so as to define the leg therebetween. Likewise, the lower surfaces of the main body may be defined on opposite respective sides of the leg. The cut-outs may also define upper surfaces opposite and facing the respective lower surfaces. These upper surfaces form the upper surfaces of the holding part defined by the plate member and are configured to face the inwardly facing surfaces of the opposing lips.

In this way, it is possible to construct an appropriate mounting bracket merely from a shaped and/or cut plate member.

Two such mounting brackets may be provided together as a bracket clip. When the bracket clip is mounted to the support portion, the respective legs and the respective main bodies of the two said mounting brackets are aligned in the longitudinal direction.

Because the resulting bracket clip has an extent in the longitudinal direction, it may provide some guidance for the ceiling panel in the longitudinal direction. Also, by having pairs of holding parts in this way, the ceiling panel may slide more easily with respect to the bracket clip. In some arrangements, the securing member may engage with only one of the pair of mounting brackets provided in the bracket clip. However, it is also possible to dimension the securing member and the respective mounting brackets of a bracket clip so that the respective lower surfaces of both mounting brackets engage with the top surface of the securing member. With pairs of main bodies in this way, each having the respective lower surfaces, improved engagement with the securing member may be achieved.

The securing member may be configured to slide relative to both the support portion and the lower surfaces of the mounting bracket. In particular, it may be configured to slide between an unlocked position in which the securing member does not engage with or press on the mounting bracket and a locked position in which the securing member does engage with or press on the mounting bracket.

In this way, it is possible for a user selectively to lock and unlock the mounting bracket from the support portion by sliding the securing member between the locked and unlocked positions.

Although it is possible to provide respective arrangements in which the securing member slides in various different directions, in one arrangement, the securing member is configured to slide against the support portion in the longitudinal direction.

Noting that the ceiling panel is elongate in the longitudinal direction, by providing a securing member that slides in the longitudinal direction, it is possible to provide a securing member with a larger/longer longitudinal extent so that it may engage with the support portion over a larger/longer surface area. Also, the securing member, when arranged as a locking wedge with an inclined top surface, may have a shallower wedge profile, because it may be moved longitudinally over a longer distance.

The securing member may define a space through which the leg of the mounting bracket can extend. The space extends in the sliding direction of the securing member. The securing member may therefore press the lower surfaces of the main body on the mounting bracket on either side of the leg and can slide relative to the leg of the mounting bracket.

In one arrangement, the space extends from an opening at a tapered front end of the securing member or the shallowest edge of the locking wedge. The elongate extent of the space thus defines two parallel wedge-shaped arms. In this way, at any time after the mounting bracket is mounted to the ceiling panel with the holding part housed inside the support channel, the securing member may be inserted between the lower surfaces of the main body of the mounting bracket and the upper surface of the support portion by placing the wedge-shaped arms on either side of the leg.

In order to form a securing member with a wedge-shape, the top surface of the securing member is inclined relative to the base surface so that the height of the securing member (between the base surface and the top surface) is longer at one end of the securing member than at the other end of the securing member. Use of a wedge shaped securing member like this allows for variants in the distance between the support portion and the main body of the mounting bracket, thereby allowing for wider tolerances in production.

In alternative arrangements, the top surface is substantially parallel with the base surface. In this way, the securing member may act simultaneously on a plurality of mounting brackets having the same spacing between their respective lower surfaces and the support portion. Furthermore, such a securing member may include a tapered front end facilitating insertion of the securing member between mounting brackets and the support portion.

Although the top surface of the securing member may be smooth, the top surface of the securing member may be stepped and may include at least one of notches, grooves and teeth. Where parallel arms are provided, separated by the space for the leg, both arms may be provided with the same form of step, such as notch, groove and teeth. The resulting ridges ensure that the securing member remains in place and is more difficult to remove. The mounting bracket and bracket clip engage the ridges so that the bracket clip cannot be squeezed together which could enable it to detach from a supporting carrier.

The ceiling panel support system may be provided with a plurality of mounting brackets and corresponding securing members for each ceiling panel. Indeed, it may be provided with a plurality of ceiling panels each having its own respective plurality of mounting brackets and securing members.

The invention will be more clearly understood from the following description, given by way of example only, with reference to the drawings, in which:

FIGS. 2(a) and (b) illustrate a cross-section through alternative baffles with a support portion;

Figure 1:
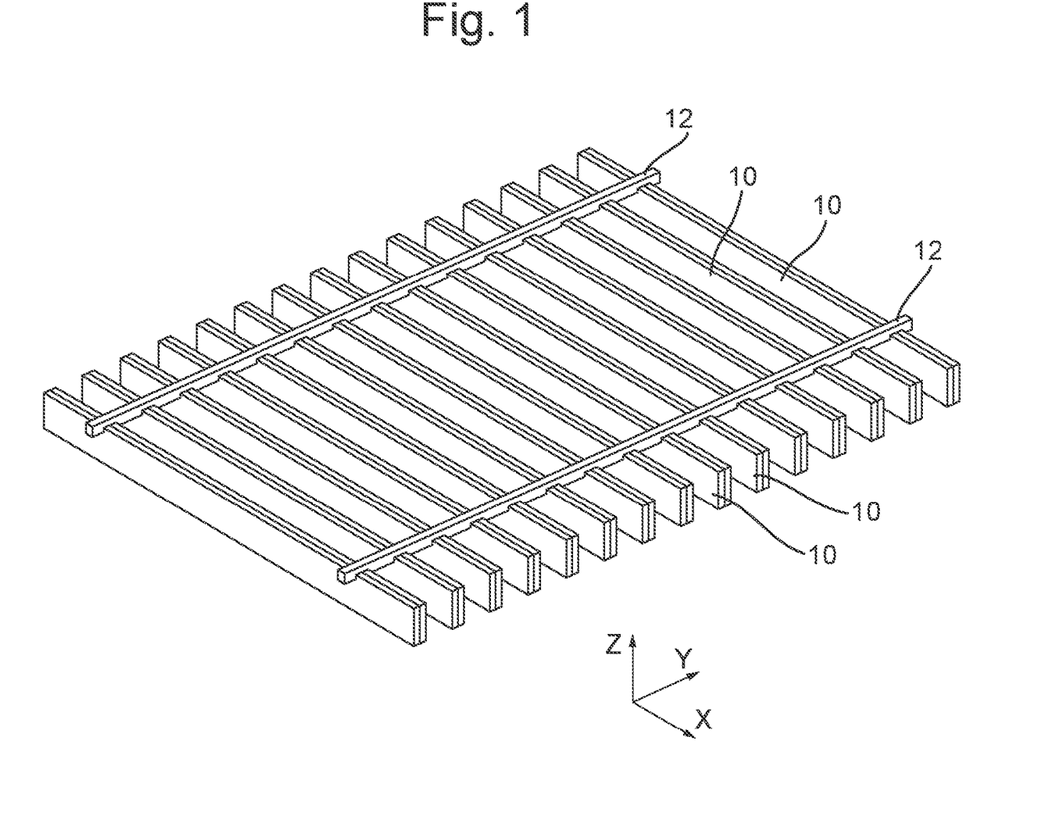
FIG. 1 illustrates a suspended array of baffles which could embody the present invention.

There may be provided a plurality of elongate ceiling panels, such as the plurality of baffles 10 shown in FIG. 1, suspended from a ceiling by means of carriers 12.

As illustrated, each of the ceiling panels 10 is elongate in a direction X. Being baffles, the illustrated ceiling panels have a width in a direction Y less than in their height in a direction Z. As illustrated in FIG. 1, an array of such panels 10 may be arranged in parallel with adjacent panels 10 arranged in the direction Y. Although the plurality of panels 10 would usually be arranged parallel with one another, it is possible for the array to be in a direction other than perpendicular to the elongate extent of the individual panels 10.

The following description similarly relates to baffles 10, but it will be appreciated that the same arrangements may be used with other ceiling panels having appropriate respective support portions.

Figures 2A, 2B:
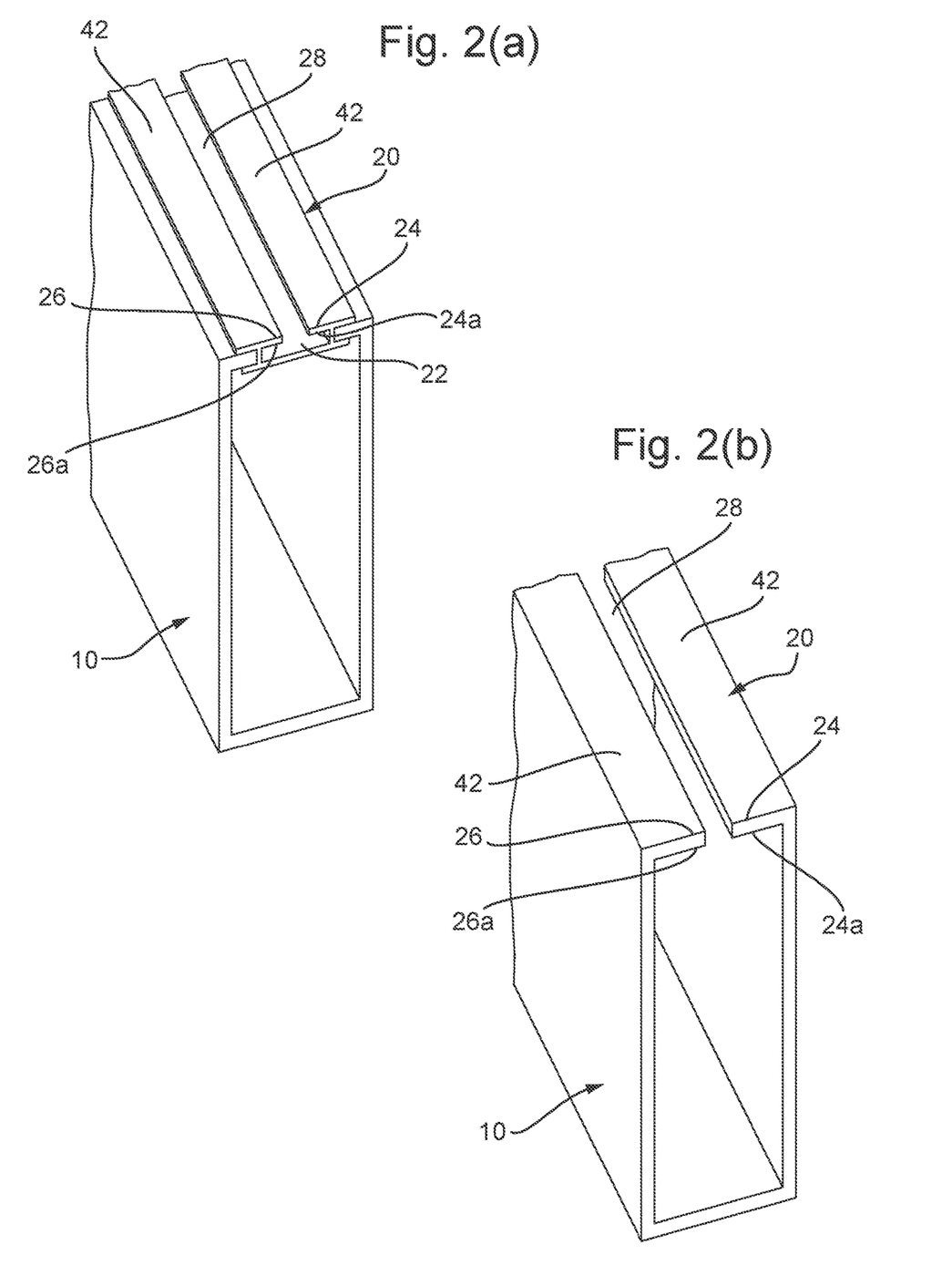

A cross-section through alternative baffles 10 are illustrated in FIGS. 2(a) and (b). In the arrangement of FIG. 2(a), the support portion 20 is provided as a component separate from the rest of the baffle 10, whereas, in the arrangement of FIG. 2(b), the support portion 20 is provided as an integral part of the baffle 10.

The support portion 20 forms part of the baffle 10 and provides means by which the baffle 10 may be supported. In use, and as illustrated, the support portion 20 is provided at an upper part of the baffle 10.

The support portion 20 has an elongate extent in the same longitudinal direction as the longitudinal direction of the elongate extent of the baffle 10. In the arrangement of FIG. 2(a), it includes an elongate support channel 22 that faces outwardly from the baffle 10. A pair of opposing lips 24, 26 form part of the elongate support channel 22 and define therebetween an elongate opening 28 into the elongate support channel 22.

As illustrated, an underside of each of the opposing lips 24, 26 is provided respectively with an inwardly facing surface 24a, 26a.

In the arrangement of FIG. 2(a), the support portion 20 may be constructed from any appropriate material. For example, the support portion 20 may be constructed from a plastics material or from aluminium. It is provided as a mounting profile and, as such, may have a substantially constant cross-section along its length. By inserting an appropriately sized and shaped mounting part into the mounting profile of the support portion 20, it becomes possible to suspend the baffle 10 by means of the support portion 20. In particular, a part of an appropriate mounting part may be mounted or received inside the elongate support channel 22 beneath the opposing lips 24 and 26 with a portion of the mounting part extending through the elongate opening 28.

In the alternative arrangement of FIG. 2(b), the baffle 10 as a whole is constructed of a material allowing its support by the integral support portion 20 of the baffle 10. With this arrangement, a mounting part may be received inside the baffle 10 itself beneath the opposing lips 24 and 24.

Figure 3A:
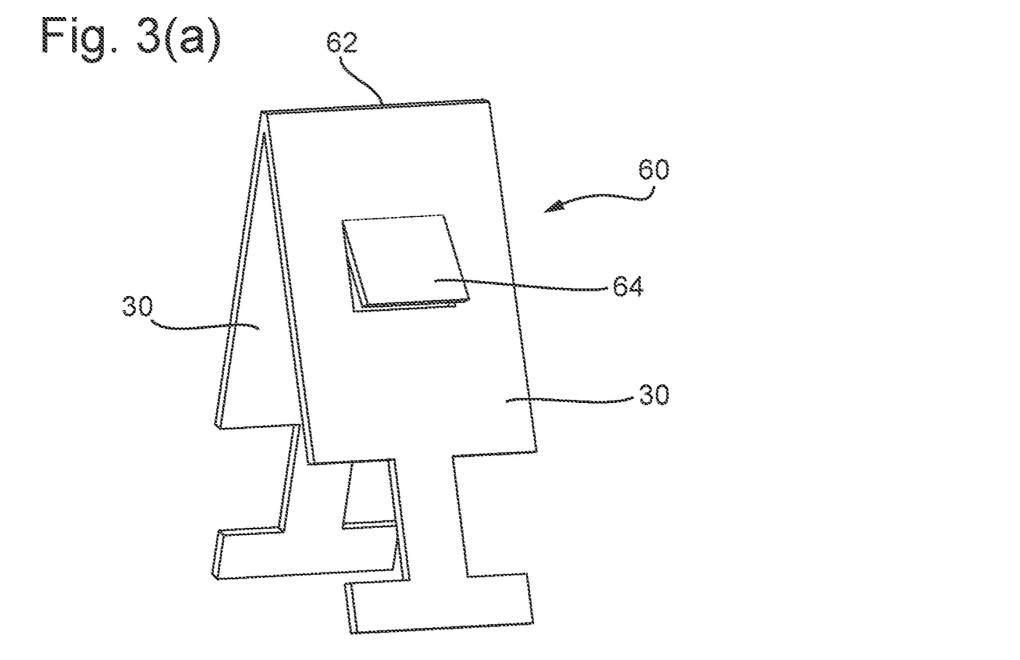
FIGS. 3(a), (b), (c) and (d) illustrates a bracket clip and a mounting bracket.
Figure 3B:
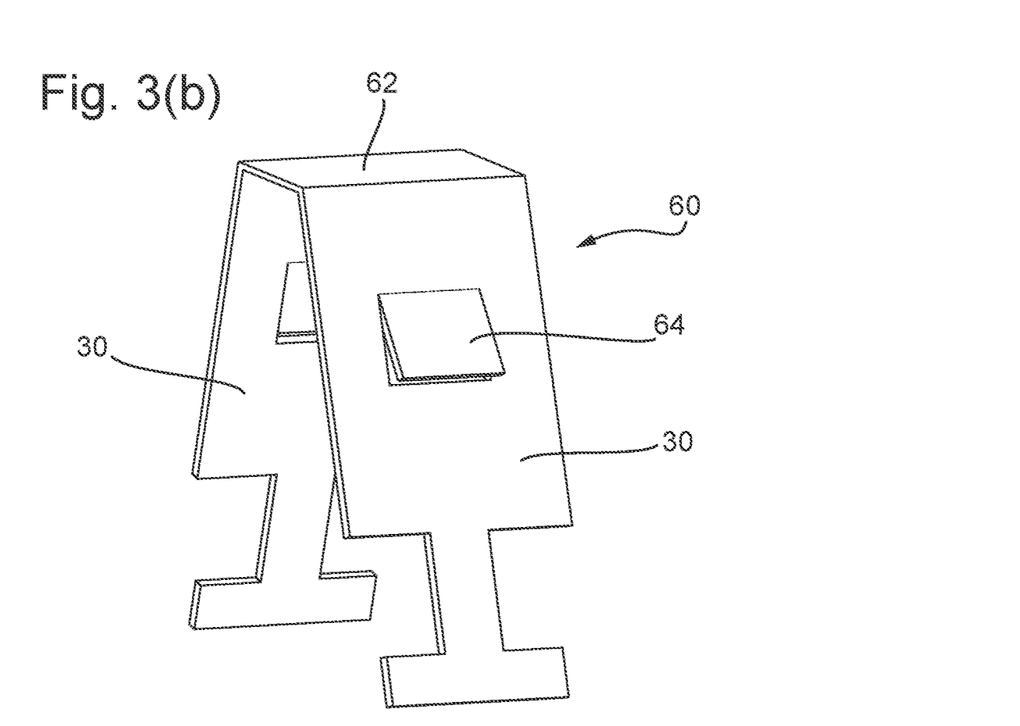
Figure 3C:
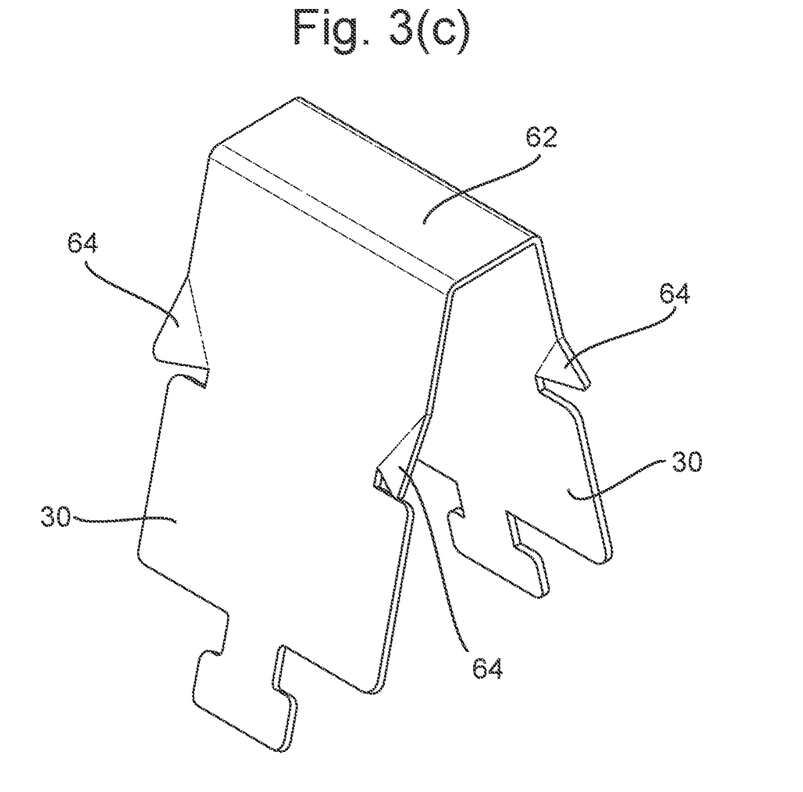

A bracket clip 60 including two mounting brackets 30 for use with the support portion 20 of FIG. 2 is illustrated in FIGS. 3(a), (b) and (c). The bracket clip 60 may be formed from a blank or plate material, such as a metal plate, which is bent/folded at a middle portion to form/create a channel-shaped bracket clip (for example V or U shaped) with an edge/fold 62 between the two mounting brackets 30. Both of the respective mounting brackets 30 may be substantially identical. As will be discussed below, the two mounting brackets 30 (the two legs of the clip 60) may be squeezed together when inserted into a carrier 12. The resilience of the bracket clip 60 and its channel-shape contribute to resisting rotation of the bracket clip 60 and its mounting brackets 30 inside the carrier 12.

Figure 3D:
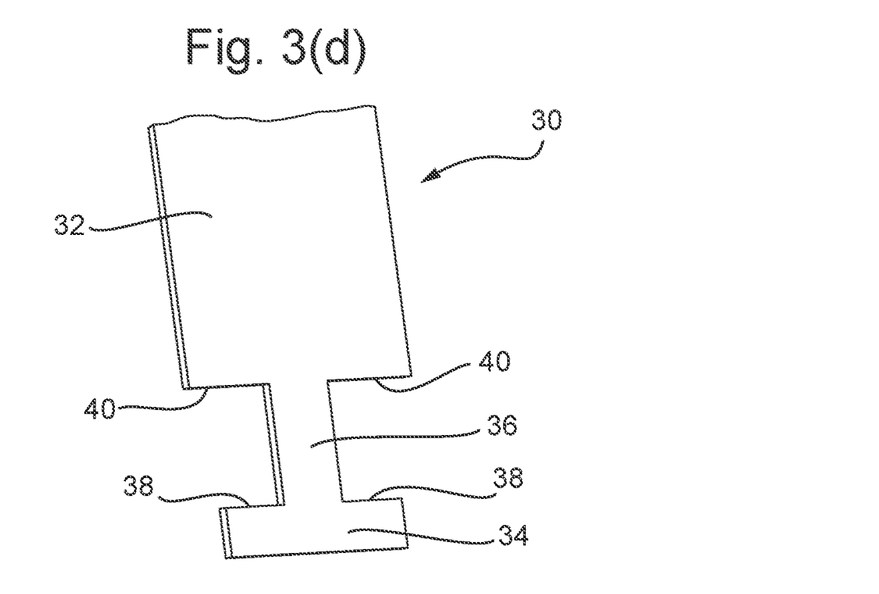

FIG. 3(d) illustrates one of the mounting brackets 30. In some arrangements individual mounting brackets 30 may be provided instead of bracket clips 60.

The illustrated mounting bracket 30 includes a main body 32, a holding part 34 and a portion 36 extending from the main body 32 to the holding part 34 herein referred to as a leg 36.

The main body 32 is arranged to be suspended by a carrier 12 in any appropriate/known manner. Suspension of a bracket clip 60 will be described below. The holding part 34 is configured to be housed within the elongate support channel 22 or within the baffle 10 itself as described above with the leg 36 extending out of the support channel 22 through the elongate opening 28.

In use and as illustrated, upper surfaces 38 of the holding part 34 on either side of the leg 36 engage with the inwardly facing surfaces 24a, 26a of the opposing lips 24, 26 of the support portion 20. In this way, the support portion 20 and the baffle 10 hang from the upper surfaces 38, suspended by a leg 36 which extends through the elongate opening 28.

In the illustrated arrangement, the inwardly facing surfaces 24a, 26a are planar and coplanar and, similarly, the upper surfaces 38 of the holding part 34 are planar and coplanar. However, other arrangements are also possible where the surfaces either side of the opening 28 and leg 36 are at different heights and/or may have curved profiles.

It will be appreciated that in use and as illustrated, with a baffle 10 suspended from a mounting bracket 30, parts of the main body 32 of the mounting bracket 30 will face downwardly towards the support portion 20.

In the illustrated arrangement, the main body 32 has, on either side of the leg 36, lower surfaces 40 which face the upper surface 42 of the support portion 20.

For the arrangement described below, the lower surfaces 40 are planar and coplanar with each other. However, arrangements may be contemplated where the lower surfaces 40 on either side of the leg 36 are at different respective heights. Similarly, they may be angled and/or have curved profiles. Arrangements may be contemplated where parts of the lower surfaces 40 distal from the leg 36 are closer to support portion 20 than parts proximate the leg 36. For example, such arrangements might be used to guide the securing member 50 to be described below.

According to the arrangement described herein, the distance between the upper surfaces 38 of the holding part 34 and the lower surfaces 40 of the main body 32 is greater than the thickness of the opposing lips 24, 26. In this way, when the support portion 20 and its baffle 10 are suspended from the mounting bracket 30, a space remains between the upper surfaces 42 of the support portion 20 and the lower surfaces 40 of the main body 32 of the mounting bracket 30. Hence, the baffle 10 can be freely positioned and repositioned relative to the mounting bracket 30 and relative to the carrier from which the mounting bracket 30 is suspended.

It is proposed that this space be filled by means of a securing member 50.

Figure 4A:
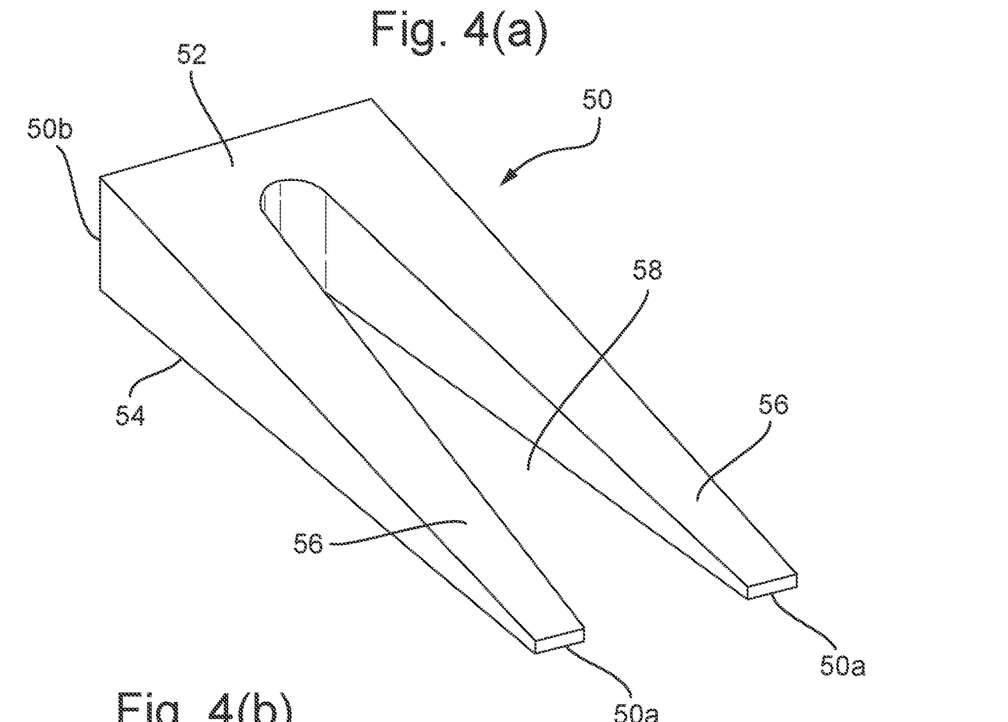
FIGS. 4(a), (b) and (c) illustrate securing members for use between the support portion of FIG. 2 and the mounting bracket of FIG. 3.
Figure 4B:
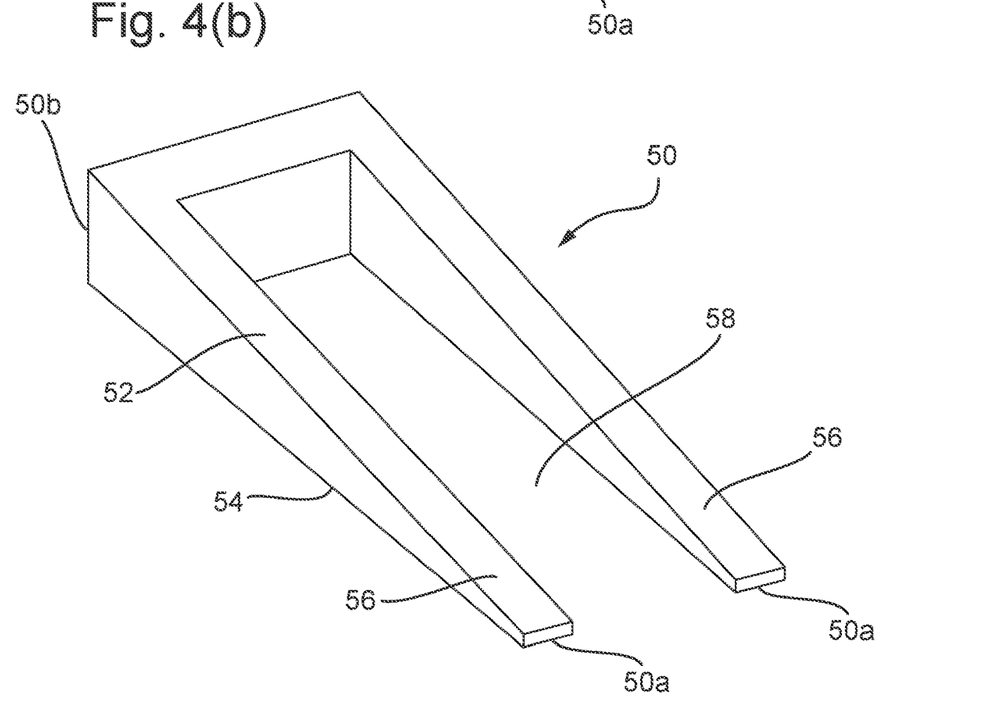
Figure 4C:
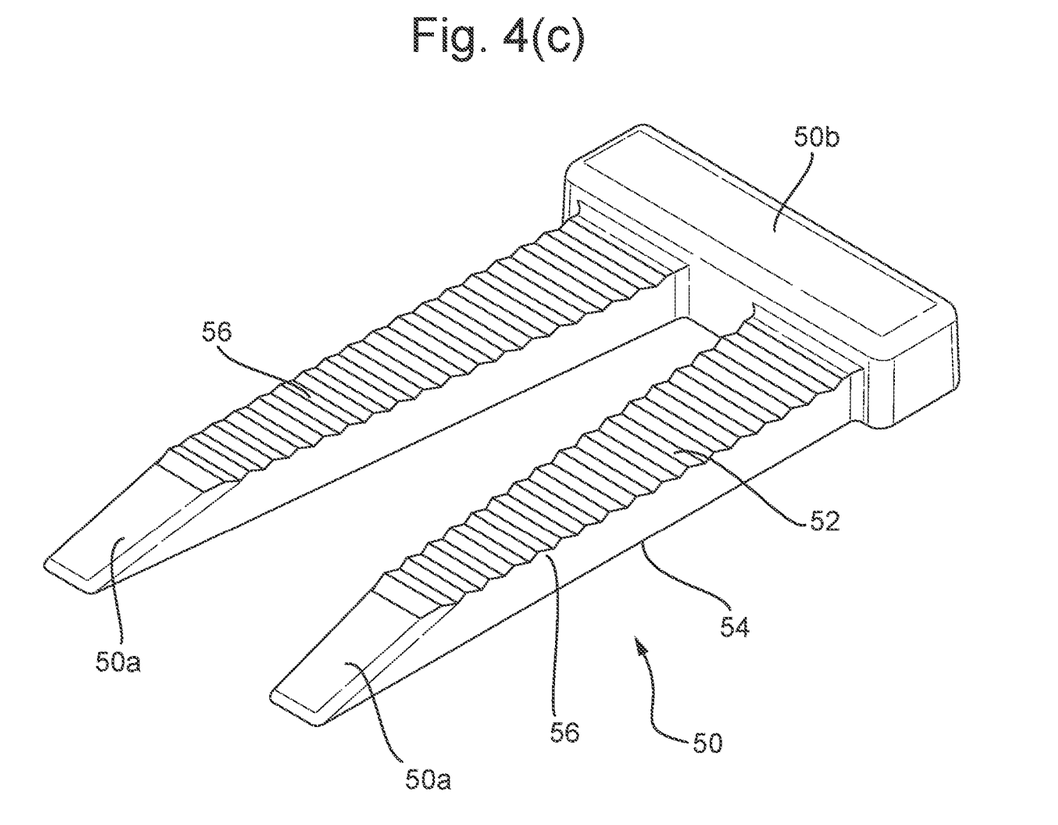

Examples of appropriate securing members 50 are illustrated in FIGS. 4(a), (b) and (c).

Figure 5A:
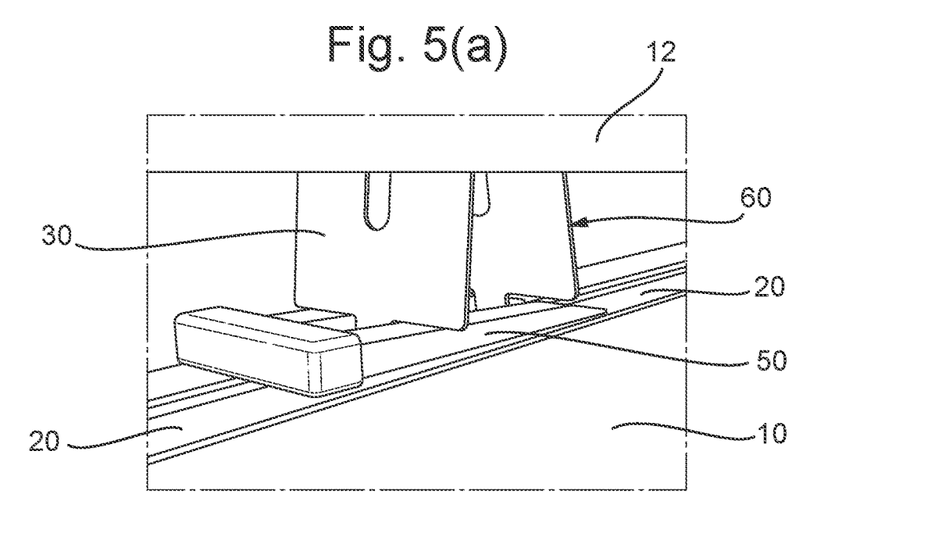
FIGS. 5(a) and (b) illustrates an assembly of the support portion of FIG. 2, the mounting bracket of FIG. 3 and the locking wedge of FIG. 4.

FIG. 5(a) illustrates an arrangement in which two mounting brackets 30 are provided together in parallel as part of a bracket clip 60. This may be secured to the underside of a carrier 12 in any appropriate/known manner. For example, a carrier 12 may have a U-shaped profile with a downward facing opening. The bracket clip 60 may be inserted into the carrier 12.

Figure 5B:
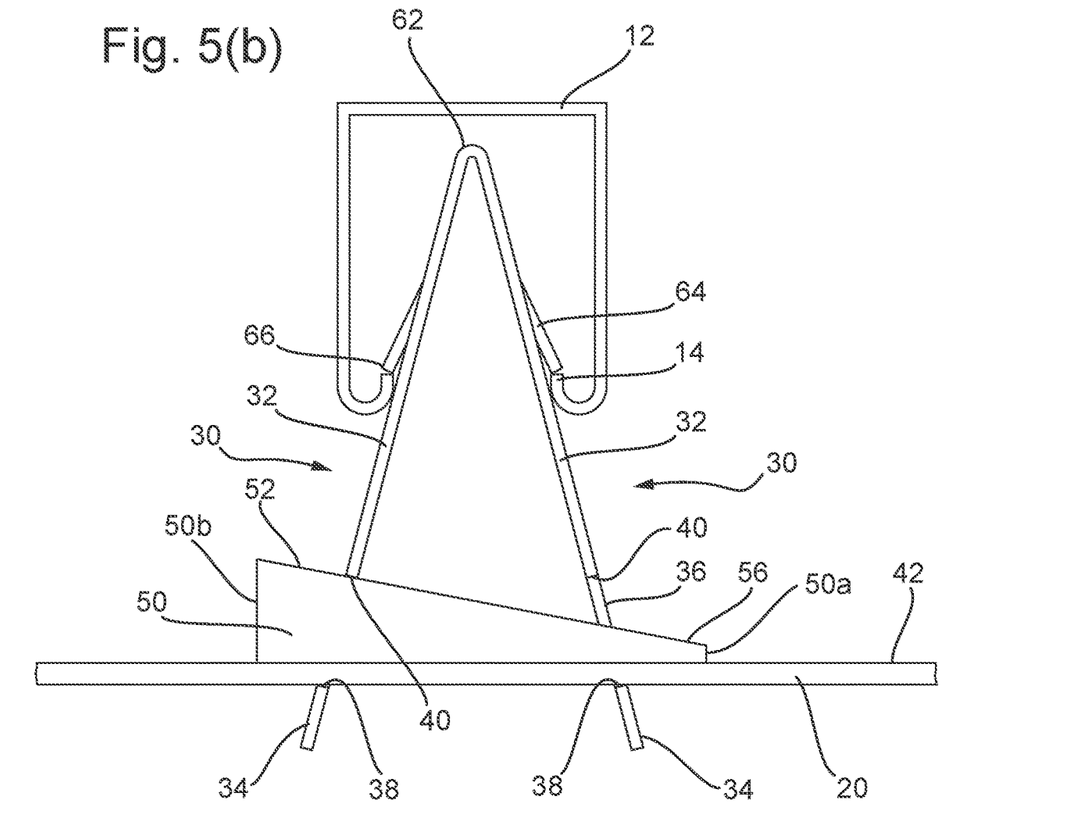

FIG. 5(b) illustrates schematically a cross-section through an arrangement such as illustrated in FIG. 5(a) with a bracket clip 60 similar to that described with reference to FIG. 3(a)

As illustrated, the pointed or folded portion 62 of the bracket clip 60 is inserted and secured to the underside of the carrier 12. In the illustrated arrangement, each mounting bracket 30 includes one or more protrusions 64 extending from the respective main body 32 and outwardly with respect to the bracket clip 60. In the illustrated arrangement in which the bracket clip 60 is formed from a bent blank such as a metal sheet or plate, the protrusions 64 may be formed as cut-outs which are bent outwardly from the plane of the main body 32.

As illustrated in FIG. 5(b), the protrusions 64 and inwardly extending features 14 of the downward facing carrier 12 may be configured to interact with one another. As illustrated in FIG. 5(b), a lower portion 66 of each protrusion 64 rests upon the respective inwardly extending feature 14 and, in particular, prevents the respective main body 32 and mounting bracket 30 moving past that feature 14. In the fitted state illustrated in FIG. 5(b), the two opposing main bodies 32 are each located adjacent a corresponding respective inwardly turned feature 14 of the carrier 12 and, with the combined width of the lower portion 66 of the two respective protrusions 64 being wider than the width defined between the two features 14 for the downwardly facing opening of the carrier 12, the bracket clip 60 is prevented from passing out of the opening and is appropriately suspended from the carrier 12. In some arrangements, the bracket clip 60 may be resilient so that the two respective mounting brackets 30 may be flexed or squeezed towards one another about the edge 62 of the bracket clip 60. In this way, a user may squeeze the two mounting brackets 30 of a bracket clip 60 towards one another so that the outer dimensions between the two opposing protrusions 64 is less than the width of the downward facing opening in the carrier 12 defined between the inwardly facing features 14. The edge 62 and the bracket clip 60 may thus be inserted into the inner space of the carrier 12 with the lower faces 66 of the protrusions 14 beyond the inwardly extending features 14. By then relaxing (releasing the squeeze on) the opposing mounting brackets 30, the respective main bodies 32 of the mounting brackets 30 are allowed to resiliently engage with and press outwardly on the two respective inwardly extending features 14 of the carrier 12. The bracket clip 60 is thus secured in place.

FIGS. 4(a) and (b) and FIGS. 5(a) and (b) illustrate securing members 50 in which substantially the entire top surface is inclined relative to the base surface so that the securing member 50 takes the form of a locking wedge. As illustrated, the securing member 50 is slid longitudinally (along the longitudinal direction of the baffle 10) between the upper surfaces 42 of the support portion 20 and the lower surfaces 40 of the two mounting brackets 30. In particular, as illustrated, the securing member 50 engages with the lower surfaces 40 of the closest mounting bracket 30 (to the left as illustrated in FIG. 5(b)). The securing member 50, by being squeezed between the upper surface 42 of the support portion 20 and the lower surface 40 of the mounting bracket 30, provides opposing forces downwards on the upper surface 42 and upwards on the lower surface 40. In this way, the holding part 34, in particular its upper surfaces 38, is thus pressed against the inwardly facing surfaces 24a, 26a of the opening lips 24, 26. Thus, accordingly, the mounting bracket 30 (and the bracket clip 60 as a whole in the arrangement as illustrated) is secured frictionally along the elongate extent of the baffle 10 to prevent movement of the baffle in the longitudinal direction.

In the illustrated embodiment, the plate-shaped mounting bracket 30 is orientated so as to extend across the width of the support portion 20 and its baffle 10. With this arrangement, the securing member 50 is provided so as to extend in the longitudinal direction of the support portion 20 and its baffle 10. Of course, it will be appreciated that the lower surfaces 40 of the mounting bracket 30 could be provided on either side of the leg 36 with a different orientation, for example orientated along the length of the support portion 20 and its baffle 10. The securing member 50 should extend at least an angle with that orientation, preferably substantially perpendicular. Hence, it will be understood that, in some arrangements, the securing member 50 could extend substantially across the width of the support portion 20.

In the described and illustrated arrangement with the plate-like mounting bracket 30, the thickness/depth of the lower surfaces 40 is relatively small. With such an arrangement, the relative angle between the plane of those lower surfaces 40 and the securing member 50 is not of great technical significance. Nevertheless, in the arrangement illustrated in FIG. 5(b), the mounting bracket 30 which is used to engage with the securing member 50 extends down from the carrier 12 at an angle substantially matching (in other words perpendicular to) the top surface 52 of the locking wedge 50. In this way, the lower surfaces 40 are substantially parallel with the top surface 52 of the securing member 50. In other arrangements, where the mounting bracket 30 has a larger thickness/depth, the lower surfaces 40 may be angled/shaped/profiled so as to match the top surface 52 of the locking wedge 50 appropriately.

An advantage of an arrangement in which the securing member 50 extends in the longitudinal direction of the support portion 20 is that the length of the securing member 50 (extending from its small height at a front end 50a to its large height at a rear end 50b) can be greater, in particular, it can be greater than the width of the baffle 10 while still being hidden from view from below. Also, the angle of the wedge shape may be smaller, allowing easier and more convenient use by an operator.

Figure 6:
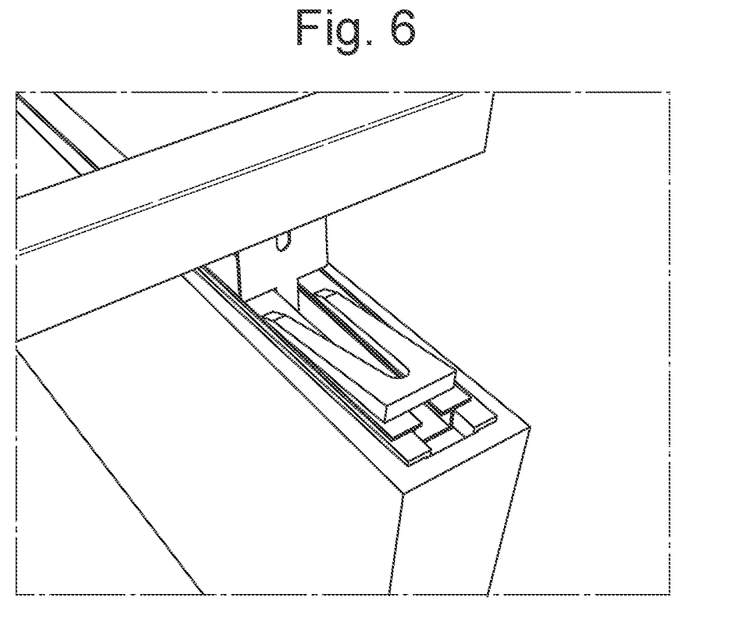
FIG. 6 illustrates an unlocked position.
Figure 7:
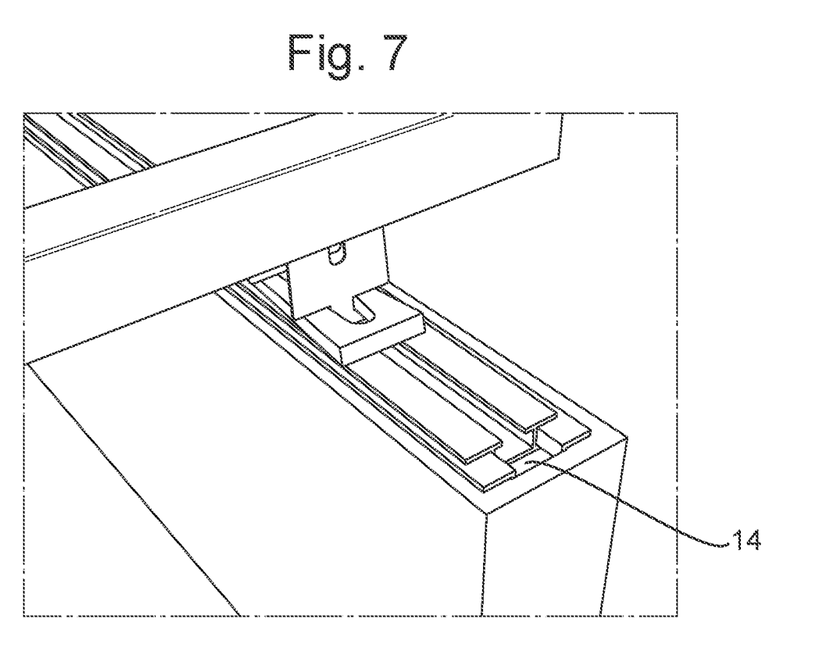
FIG. 7 illustrates a locked position.

FIG. 6 and FIG. 7 illustrate respectively the securing member 50 in an unlocked position and a locked position.

As illustrated, the two mounting brackets 30 of a bracket clip 60 have been mounted to the support portion 20.

With a mounting bracket 30 so arranged with its lower surfaces 40 facing the upper surface 42 of the support portion 20, a space is formed allowing insertion of the front end 50a of the securing member 50 between the lower surfaces 40 and the upper surface 42 of the support portion 20. In particular, a base surface 54 of the securing member 50 is placed on and contacts the upper surface 42 of the support portion 20.

An operator may then slide the securing member 50 longitudinally along the support portion 20 so that the securing member 50 is further inserted under the lower surfaces 40 and between the lower surfaces 40 and the upper surface 42.

Noting that the support portion 20 and its baffle 10 are hanging from the mounting bracket 30 with the upper surfaces 38 of the holding part 34 engaging with the inwardly facing surfaces 24a, 26a, a gap will remain until the height of the securing member 50 between the lower surfaces 40 and the upper surface 42 matches the space between the lower surfaces 40 and the upper surface 42. Thus, the rear end 50b of the securing member 50 continues to be moved by the operator towards the mounting bracket 30 until, as illustrated in FIG. 7, the space between the lower surfaces 40 and the upper surface 42 is filled by the height of the securing member 50.

In the locked position illustrated in FIG. 7, the top surface 56 of the securing member 50 engages with and presses upon the lower surfaces 40 of the mounting bracket 30. It can also be considered that the securing member 50 is thus squeezed between the lower surfaces 40 of the mounting bracket 30 and the upper surface 42 of the support portion 20. Also, the pressing by the top surface 56 of the securing member 50 upwardly on the lower surfaces 40 of the mounting bracket 30 causes the upper surfaces 38 of the holding part 34 to be pressed against the inwardly facing surfaces 24a, 26a of the opposing lips 24, 26 of the support portion 20.

In this way, the mounting bracket 30 is secured longitudinally with respect to the support portion 20 and its baffle 10.

If, at some point in time, the operator wishes to readjust the position of the baffle 10 relative to the mounting bracket 30, the rear end 50b of the securing member 50 may be pulled away from the mounting bracket 30 so that the securing member 50 is withdrawn from under the lower surfaces 40 of the mounting bracket 30 and slid towards the unlocked position illustrated in FIG. 6.

For the convenience of the operator, a handle may be formed at the rear end 50b of the securing member 50.

As best illustrated in FIGS. 4(a) and (b), the securing member 50 may comprise two parallel wedge-shaped arms 56 defining a space 58 therebetween. Although it would be possible to provide a securing member for engaging only one of the lower surfaces 40 one respective side of the leg 36 and, optionally, to provide two such securing members for use either side of the leg 36, in the illustrated arrangement, a single securing member 50 may be used simultaneously to press on both of the lower surfaces 40 of a single mounting bracket 30.

In use when the securing member 50 is moved between the unlocked and locked positions, the two arms 56 of the securing member 50 extend on either side of the leg 36 of the mounting bracket 30 under the two lower surfaces 40 respectively. The space 58 between the arms 56 allows the leg 36 to extend through the securing member 50 and allows the securing member 50 to slide in the sliding direction of the securing member 50 relative to the leg 36.

In the illustrated arrangement, the space 58 is open at the front end 50a (having the smallest height) so that the securing member 50 may be inserted between the mounting bracket 30 and the support portion 20 after the mounting bracket 30 has been mounted to the support portion 20. However, it would also be possible for the space 58 to be closed at the front end 50a of the securing member 50. Such an arrangement would merely require the leg 36 (and the holding part 34) to be inserted through the space 58 prior to the mounting bracket 30 being mounted to the support portion 20.

As will be apparent from the above, a securing member 50 formed as a locking wedge 50 is a wedge shaped component having a base surface 54 and a top surface 56 which extends from a front end 50a to a rear end 50b at an inclined angle with respect to the base surface.

Figure 8:
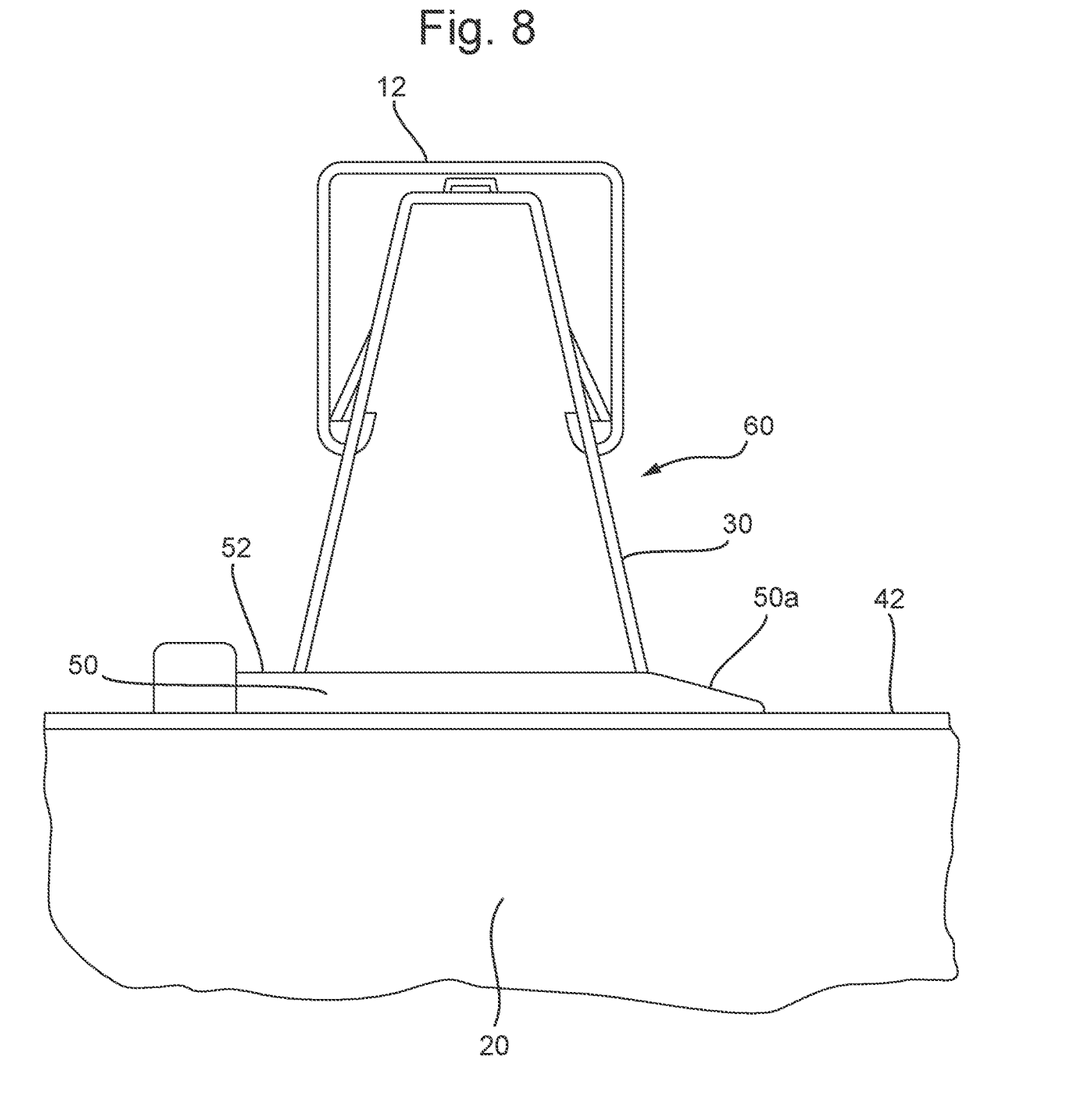
FIG. 8 illustrates a cross-section equivalent to FIG. 5(b) with a parallel face securing member.

Returning to FIG. 4(c), it will be noted that, in some arrangements, the top surface 56 of the securing member 50 is substantially parallel with the base surface 54. In this way, as illustrated in FIG. 8, where a pair of mounting brackets 30 are provided, for example as part of a bracket clip 60 as discussed above, both lower surfaces 40 of the respective main bodies 32 interact with the top surface 52 of the securing member 50. In this arrangement, the height of the securing member 50, in particular between the base surface 54 and the top surface 56 is configured to match (or slightly exceed) the space between the lower surfaces 40 of the mounting brackets 30 and the upper surface 32 of the support portion 20.

Figure 9A:
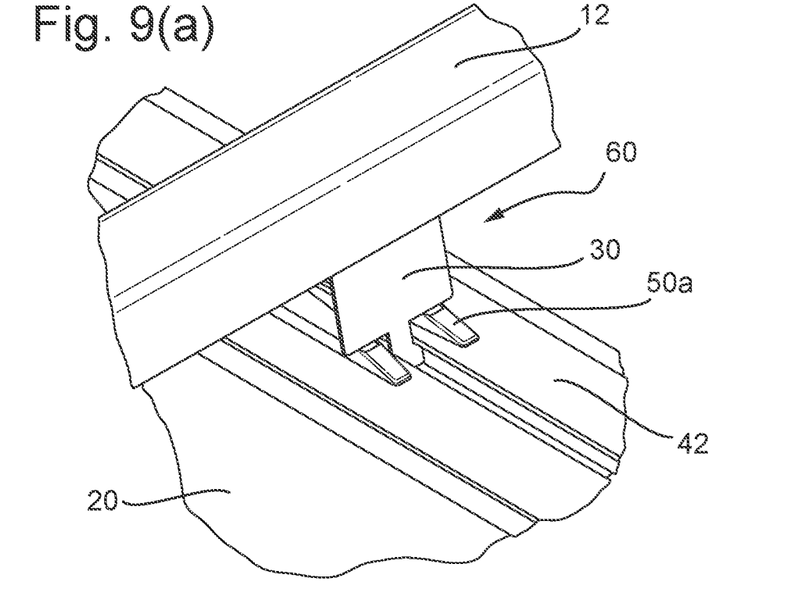
FIGS. 9(a) and (b) illustrate perspective views of the arrangements of FIG. 8.
Figure 9B:
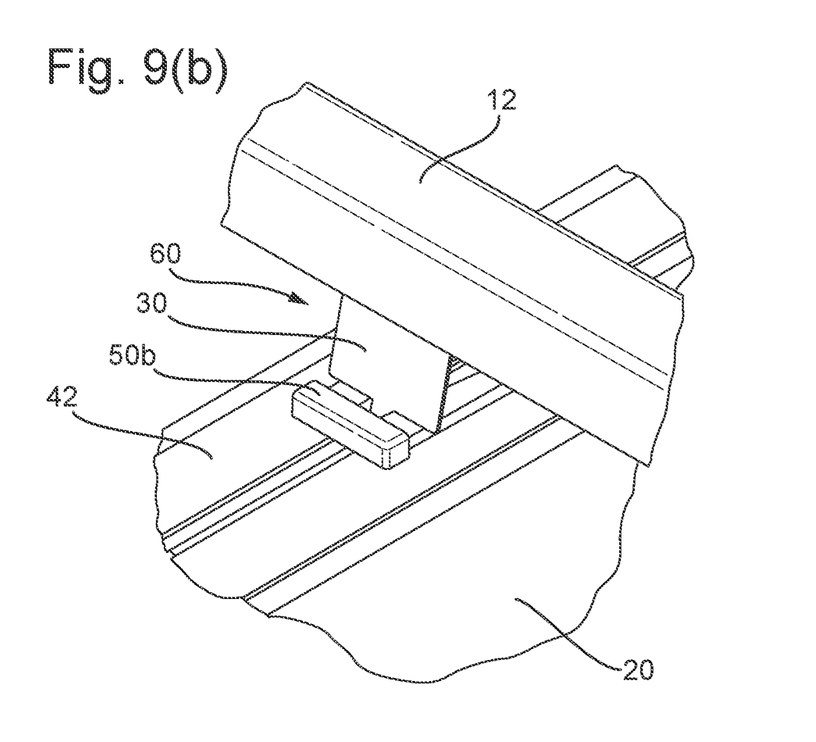

In an unlocked position, the securing member 50 (at least the substantially parallel top surface 52) is not located under either of the lower surfaces of the mounting brackets 30 of the bracket clip 60. In the corresponding locked position illustrated in FIGS. 9(a) and (b), the respective lower surfaces 40 of both brackets 30 of the bracket clip 60 are held away from the upper surface 42 of the support portion 20 by any resilience in the securing member 50. In this way, as described above, the position of the support portion 20 may be held frictionally with respect to mounting brackets 30 and bracket clip 60.

In the illustrated arrangement of FIG. 4(c), the front end 50a of each part of the locking wedge 50 may itself be tapered. It will be appreciated that this is useful and assists when inserting the securing member 50 between the lower surfaces 40 of the mounting brackets 30 and the upper surface 42 of the support portion 20. In particular, the taper of the tapered end 50a guides the securing member 50 between the lower surfaces 40 of the mounting brackets 30 and the upper surface 42 of the support portion 20.

It is possible for the top surface 52 of the support member 50 to be smooth as illustrated in FIGS. 4(a) and (b) and to rely merely on friction and the resilient properties of the support member 50 and/or the support portion 20 and/or the mounting bracket 30.

Figure 10:
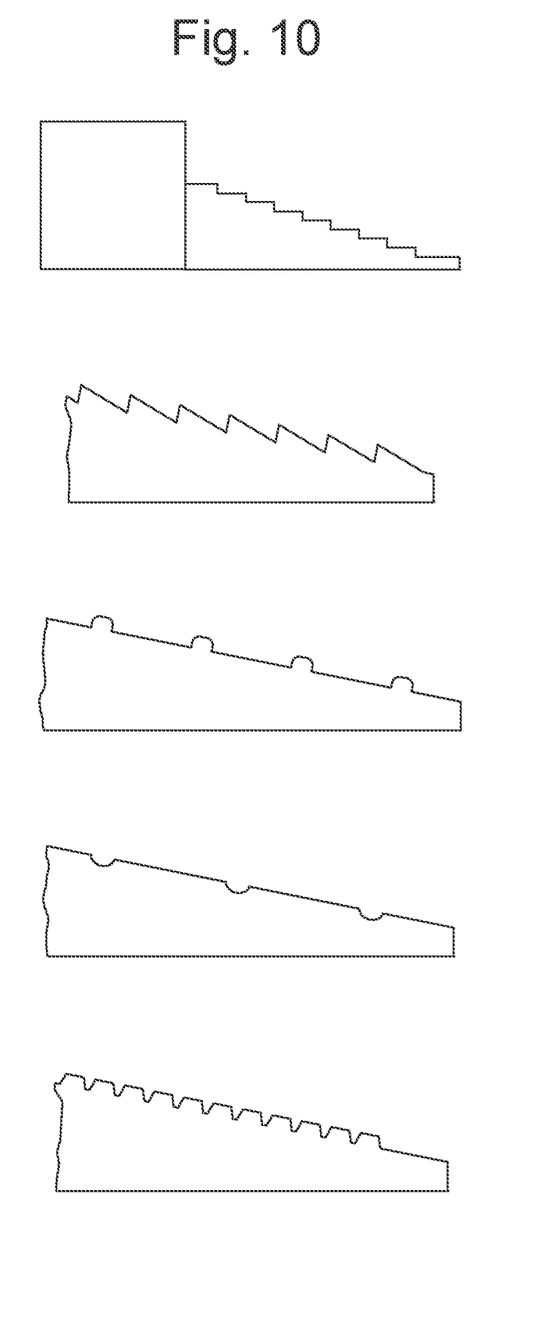
FIG. 10 illustrates schematically alternative features/shapes for the top surface of the securing member.

Alternatively, the top surface 52 may be stepped in order to more securely lock the baffle in place. As illustrated schematically in FIG. 10, the steps can be formed by a variety of features/shapes, such as notches, grooves, teeth etc. These features can provide better engagement, for example for securely holding the securing member in place.

FIG. 4(c) illustrates a support member 50 having notches/teeth. The ridges in the top surface 52 of the securing member 50 help ensure that the securing member 50 remains in place and makes it more difficult for it to be removed. In addition, the lower surfaces 40 of the mounting brackets 30 of the bracket clip 60 engage with such ridges and prevent the two respective mounting brackets 30 from being squeezed together (pivoted about the folded portion 62) and, hence, help resist against release of the bracket clip 60 from a carrier 12 as illustrated in FIG. 5(b).

It will be noted that the arrangement of FIG. 6 and FIG. 7 show a support portion 20 which does not extend to the end of the baffle 10, but instead leaves a gap defining an insert opening 14. Respective holding parts 34 of mounting brackets 30 may be inserted into the elongate support channel 28 of the support 20. Similarly, where the support portion 20 is integral with the baffle, the holding parts 34 may be inserted through this gap to the space within the baffle 10 beneath the opposing lips 24 and 26.

Alternatively, for the arrangement described above where two mounting brackets 30 are provided together as part of a bracket clip 60 and can be resiliently squeezed towards one another, it is possible to mount a bracket clip 60 to a support portion 20 by squeezing the two mounting brackets 30 towards one another to a state in which the combination of the thickness of the two mounting brackets 30 and the space between them is no more than the distance between the opposing lips 24 and 26. In this state of the bracket clip 60, it is possible to orientate the bracket clip 60 perpendicular to its intended in-use orientation and insert the two respective holding parts 34 through the elongate opening 28, and then relax the squeezing of the two mounting brackets 30 and rotate the bracket clip 60 to its in-use orientation and position as described above.

The invention claimed is:

1. A ceiling panel support system including:
    a ceiling panel having an elongate extent in a longitudinal direction and an elongate support portion from which the panel can be suspended, the support portion having an elongate support channel facing outwardly from the panel, the elongate support channel having a pair of opposing lips defining an elongate opening into the elongate support channel, and the opposing lips having, respectively, inwardly facing surfaces; and
    a mounting bracket having a main body to be suspended by a carrier, a holding part configured to be housed within the elongate support channel-behind and configured to engage with the inwardly facing surfaces of the opposing lips, and a leg configured to extend from the main body to the holding part between the opposing lips; wherein:
    the main body of the mounting bracket includes lower surfaces on either side of the leg configured to face the support portion when the mounting bracket is fitted to the ceiling panel with the holding part housed within the elongate support channel;
    the system further includes a securing member having a base surface configured to engage with the support portion and a top surface configured to engage with the lower surfaces of the mounting bracket, the securing member is configured to be inserted between the support portion and the lower surfaces of the main body of the mounting bracket, and, with the securing member so inserted, the base surface and the top surfaces are configured to provide respective opposing forces on the support portion and the lower surfaces of the mounting bracket respectively, thereby pressing the holding part against the inwardly facing surfaces of the opening lips and securing the mounting bracket frictionally along the elongate extent of the panel; and the securing member is configured to slide relative to both the support portion and the lower surfaces of the mounting bracket and to slide between an unlocked position in which the securing member does not press the mounting bracket and a locked position in which the securing member does press the mounting bracket.

2. A ceiling panel support system according to claim 1 wherein the ceiling panel is a baffle.

3. A ceiling panel support system according to claim 1 wherein the ceiling panel is a felt baffle.

4. A ceiling panel support system according to claim 1 wherein the mounting bracket comprises a plate member having opposing cut-outs on opposite respective sides so as to define the leg therebetween and to define the lower surfaces of the main body on opposite respective sides of the leg, wherein the cut-outs also define upper surfaces opposite and facing the respective lower surfaces, the upper surfaces being upper surfaces of the holding part defined by the plate member and configured to face the inwardly facing surfaces of the opposing lips.

5. A ceiling panel support system according to claim 1 including two of said mounting brackets provided together as a bracket clip wherein, when the bracket clip is mounted to the support portion, the respective legs and the respective main bodies of the two said mounting brackets are aligned in the longitudinal direction.

6. A ceiling panel support system according to claim 1 wherein the securing member is configured to slide against the support portion in the longitudinal direction.

7. A ceiling panel support system according to claim 1 wherein the securing member defines a space through which the leg of the mounting bracket can extend, the space extending in a sliding direction of the securing member so that the securing member can press the lower surfaces of the main body of the mounting bracket on either side of the leg and can slide relative to the leg.

8. A ceiling panel support system according to claim 1 wherein the top surface is inclined relative to the base surface.

9. A ceiling panel support system according to claim 1 wherein the top surface is substantially parallel with the base surface.

10. A ceiling panel support system according to claim 9 where the securing member includes a tapered front end.

11. A ceiling panel support system according to claim 8 wherein the top surface of the securing member is smooth.

12. A ceiling panel support system according to claim 8 wherein the top surface of the securing member is stepped and includes at least one of notches, grooves and teeth.

13. A ceiling panel support system according to claim 9 wherein the top surface of the securing member is smooth.

14. A ceiling panel support system according to claim 9 wherein the top surface of the securing member is stepped and includes at least one of notches, grooves and teeth.

15. A ceiling panel support system including:
a ceiling panel having an elongate extent in a longitudinal direction and an elongate support portion from which the panel can be suspended, the support portion having an elongate support channel facing outwardly from the panel, the elongate support channel having a pair of opposing lips defining an elongate opening into the elongate support channel, and the opposing lips having, respectively, inwardly facing surfaces; and
a mounting bracket having a main body to be suspended by a carrier, a holding part configured to be housed within the elongate support channel and configured to engage with the inwardly facing surfaces of the opposing lips, and a leg configured to extend from the main body to the holding part between the opposing lips; wherein:
the main body of the mounting bracket includes lower surfaces on either side of the leg configured to face the support portion when the mounting bracket is fitted to the ceiling panel with the holding part housed within the elongate support channel;
the system further includes a securing member having a base surface configured to engage with the support portion and a top surface configured to engage with the lower surfaces of the mounting bracket, the securing member is configured to be inserted between the support portion and the lower surfaces of the main body of the mounting bracket, and, with the securing member so inserted, the base surface and the top surfaces are configured to provide respective opposing forces on the support portion and the lower surfaces of the mounting bracket respectively, thereby pressing the holding part against the inwardly facing surfaces of the opening lips and securing the mounting bracket frictionally along the elongate extent of the panel; and
wherein the securing member defines a space through which the leg of the mounting bracket can extend, the space extending in a-sliding direction of the securing member so that the securing member can press the lower surfaces of the main body of the mounting bracket on either side of the leg and can slide relative to the leg.

16. A ceiling panel support system including:
a ceiling panel having an elongate extent in a longitudinal direction and an elongate support portion from which the panel can be suspended, the support portion having an elongate support channel facing outwardly from the panel, the elongate support channel having a pair of opposing lips defining an elongate opening into the elongate support channel, and the opposing lips having, respectively, inwardly facing surfaces; and
a mounting bracket having a main body to be suspended by a carrier, a holding part configured to be housed within the elongate support channel and configured to engage with the inwardly facing surfaces of the opposing lips, and a leg configured to extend from the main body to the holding part between the opposing lips; wherein:
the main body of the mounting bracket includes lower surfaces on either side of the leg configured to face the support portion when the mounting bracket is fitted to the ceiling panel with the holding part housed within the elongate support channel;
the system further includes a securing member having a base surface configured to engage with the support portion and a top surface configured to engage with the lower surfaces of the mounting bracket, the securing member is configured to be inserted between the support portion and the lower surfaces of the main body of the mounting bracket, and, with the securing member so inserted, the base surface and the top surfaces are configured to provide respective opposing forces on the support portion and the lower surfaces of the mounting bracket respectively, thereby pressing the holding part against the inwardly facing surfaces of the opening lips and securing the mounting bracket frictionally along the elongate extent of the panel; and the top surface of the securing member is inclined relative to the base surface of the securing member.

17. A ceiling panel support system according to claim 16 wherein the top surface of the securing member is smooth.

18. A ceiling panel support system according to claim 16 wherein the top surface of the securing member is stepped and includes at least one of notches, grooves and teeth.

* * * * *